(12) United States Patent
Miller et al.

(10) Patent No.: US 10,095,238 B2
(45) Date of Patent: Oct. 9, 2018

(54) AUTONOMOUS VEHICLE OBJECT DETECTION

(71) Applicant: Ford Global Technologies, LLC, Dearborn, MI (US)

(72) Inventors: Kenneth James Miller, Canton, MI (US); Douglas Raymond Martin, Canton, MI (US); Aed M. Dudar, Canton, MI (US); William Paul Perkins, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 15/378,934

(22) Filed: Dec. 14, 2016

(65) Prior Publication Data

US 2018/0164833 A1 Jun. 14, 2018

(51) Int. Cl.
*G01C 22/00* (2006.01)
*G05D 1/00* (2006.01)
*G05D 1/02* (2006.01)
*G08G 1/16* (2006.01)
*B60W 30/18* (2012.01)
*B60W 50/038* (2012.01)

(52) U.S. Cl.
CPC ........ *G05D 1/0276* (2013.01); *B60W 30/18* (2013.01); *B60W 50/038* (2013.01); *G05D 1/0088* (2013.01); *G08G 1/161* (2013.01); *B60W 2550/10* (2013.01); *B60W 2550/20* (2013.01); *B60W 2720/10* (2013.01)

(58) Field of Classification Search
CPC ... G05D 1/0276; G05D 1/0088; B60W 30/18; B60W 50/038; B60W 2550/10; B60W 2550/20; B60W 2720/10; G08G 1/161
See application file for complete search history.

(56) References Cited

U.S. PATENT DOCUMENTS

| 8,229,663 | B2 | 7/2012 | Zeng et al. |
| 8,666,587 | B2 | 3/2014 | Anderson |
| 8,892,271 | B2* | 11/2014 | Breed ................. G08G 1/161 701/2 |
| 8,965,677 | B2* | 2/2015 | Breed ................. B60W 30/04 701/301 |
| 9,102,220 | B2* | 8/2015 | Breed ................. B60R 21/0132 |

(Continued)

FOREIGN PATENT DOCUMENTS

| DE | 102012024456 A1 | 1/2014 |
| GB | 2524393 A | 9/2015 |
| KR | 101393921 B1 | 5/2014 |

OTHER PUBLICATIONS

Search Report issued by United Kingdom Intellectual Property Office dated May 24, 2018 regarding Application No. GB1720238.3 (3 pages).

*Primary Examiner* — Mussa A Shaawat
(74) *Attorney, Agent, or Firm* — Frank A. MacKenzie; Bejin Bieneman PLC

(57) ABSTRACT

A computer in a vehicle can determine a first distance from a vehicle to a traffic object and receive, via a network interface, a second distance from a second vehicle to the traffic object and a third distance from the second vehicle to the vehicle. The computer can determine a fourth distance by triangulation based on the second distance and the third distance and pilot the vehicle based on combining the first distance and the fourth distance.

18 Claims, 6 Drawing Sheets

(56) References Cited

U.S. PATENT DOCUMENTS

| | | | |
|---|---|---|---|
| 9,344,856 B2 | 5/2016 | Zhang et al. | |
| 9,420,412 B2 | 8/2016 | Ho | |
| 9,868,394 B1* | 1/2018 | Fields | B60Q 9/008 |
| 9,870,649 B1* | 1/2018 | Fields | G07C 5/008 |
| 2008/0065328 A1* | 3/2008 | Eidehall | G01S 7/295 |
| | | | 701/301 |
| 2013/0231824 A1* | 9/2013 | Wilson | G05D 1/0246 |
| | | | 701/26 |
| 2014/0012492 A1* | 1/2014 | Bowers | G08G 1/166 |
| | | | 701/301 |
| 2015/0035685 A1* | 2/2015 | Strickland | B60Q 9/008 |
| | | | 340/901 |
| 2015/0035687 A1 | 2/2015 | Bowers et al. | |
| 2015/0112800 A1* | 4/2015 | Binion | G06Q 30/0255 |
| | | | 705/14.53 |
| 2015/0158495 A1* | 6/2015 | Duncan | B60W 40/09 |
| | | | 701/1 |
| 2015/0161894 A1* | 6/2015 | Duncan | G08G 1/163 |
| | | | 701/1 |
| 2015/0170522 A1* | 6/2015 | Noh | G08G 1/096741 |
| | | | 701/117 |
| 2015/0235557 A1* | 8/2015 | Engelman | G08G 1/091 |
| | | | 701/24 |
| 2015/0310742 A1* | 10/2015 | Albornoz | G08G 1/096716 |
| | | | 340/905 |
| 2016/0116293 A1* | 4/2016 | Grover | G01C 21/34 |
| | | | 701/23 |
| 2017/0043771 A1* | 2/2017 | Ibanez-Guzman | B60W 30/0956 |
| 2017/0219694 A1* | 8/2017 | Send | G01S 7/32 |
| 2017/0297568 A1* | 10/2017 | Kentley | B60W 30/09 |

* cited by examiner

AUTONOMOUS VEHICLE OBJECT DETECTION

BACKGROUND

Vehicles can be equipped to operate in both autonomous and occupant piloted mode. Vehicles can be equipped with computing devices, networks, sensors and controllers to pilot the vehicle and to assist an occupant in piloting the vehicle. A computing device can monitor the operation of the computing devices, networks, sensors and controllers to determine electrical and logical health of the computing devices, networks, sensors and controllers.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portion of a path.

Figure 1:
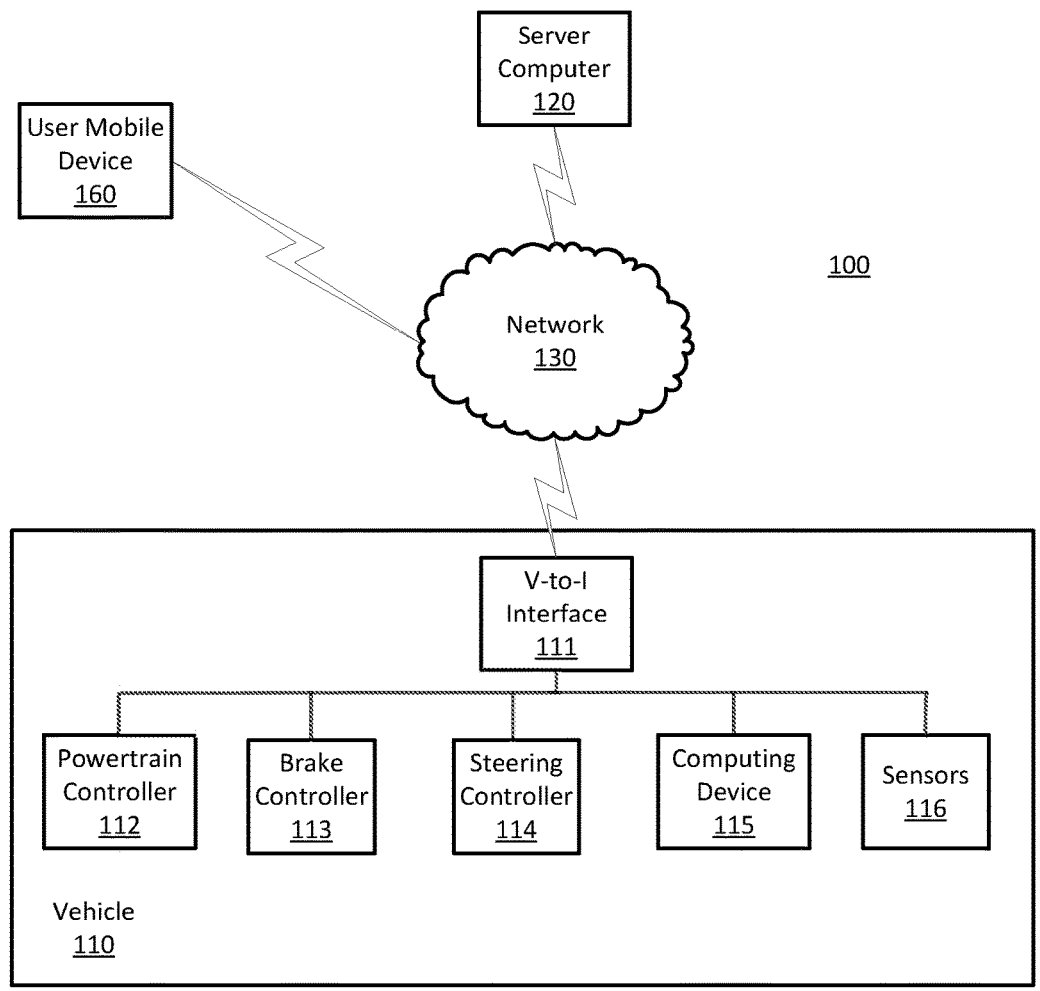
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Computing device 115 includes onboard diagnostics hardware and software that detects sensor 116 reliability, where reliability is defined as a probability that sensors 116 are providing timely and accurate information to computing device 115. Since piloting vehicle 110 safely can depend upon timely and accurate information from sensors 116, computing device 115 can require reliability of 99.9% or greater from sensors 116. This very stringent requirement for sensor 116 reliability means that even temporary disruptions in sensors 116 caused by weather or debris, for example, can cause reliability to drop below 99.9%.

When onboard diagnostics determine that sensors 116 are less than 99.9% reliable, computing device 115 cannot predict safe piloting of vehicle 110. In this case, computing device 115 can direct vehicle to pull out of roadway traffic and park. This can provide a hazard to other vehicles and impede traffic. In cases where computing device 115 is piloting vehicle 110 to assist an occupant when onboard diagnostics determine that sensors 116 are less than 99.9% reliable, computing device 115 can suddenly return control of vehicle 110 steering, braking and propulsion to the occupant. This can be regarded as highly unpleasant by an occupant.

Figure 2:
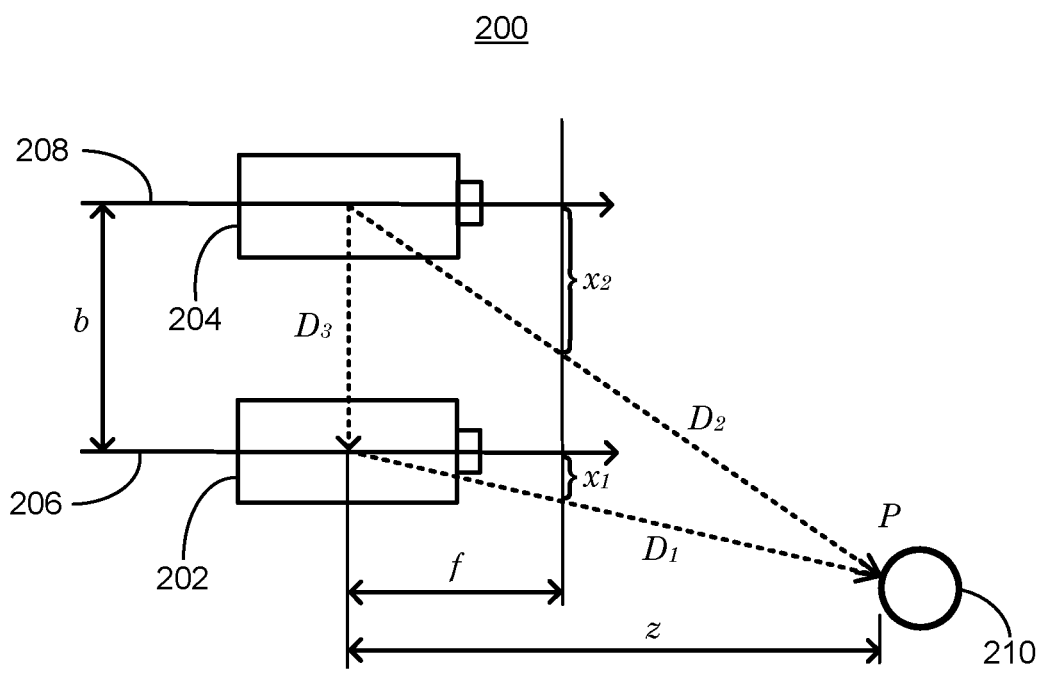
FIG. 2 is a diagram of two example vehicle cameras.

FIG. 2 is a diagram of a traffic scene 200 that is an example of a technique for increasing the reliability of sensors 116. Traffic scene 200 includes two cameras 202, 204. Camera 202 is included in a first vehicle 110 and camera 204 is included in a second vehicle 110. First and second vehicles 110 are traveling on a roadway in the directions indicated by arrows 206, 208 respectively. Each camera 202, 204 is aligned with the directions of travel. The directions of travel of first and second vehicles 110 are assumed to be parallel in this example.

First and second vehicles 110 are equipped with sensors 116 that can determine distance vectors $D_1$ and $D_2$ using known techniques including processing video images and LIDAR, as discussed above in relation to FIG. 1. Distance vectors $D_1$ and $D_2$, represented by dotted lines, from first and second vehicles 110 and a traffic object 210 including cameras 202, 204, respectively. Distance vectors are vector quantities that have an origin or location in three-dimensions, for example X, Y and Z, a distance, which is a scalar quantity, and a direction, expressed as three angular quantities $\rho$, $\phi$ and $\theta$, measured as rotations with respect to each of the X, Y and Z axes. First and second vehicles 110 are also equipped with sensors 116 that can determine distance vector $D_3$, represented by a dotted line, between first and second vehicles 110. First and second vehicles 110 are also equipped with V-to-I interfaces 111 that permit communications between first and second vehicles 110 via a local area network.

Traffic object 210 can be any object that can be identified by computing device 115 and sensors 116 and have a point P selected to designate it, including lighting and sign poles, barriers, railings, abutments, markers, signs and visual signals, etc. Computing device 115 can include a database of traffic objects 210 including the location to assist in identifying traffic objects 210, for example. Computing device 115 can also receive information regarding the identity and location of traffic object from a local area network via V-to-I interface 111.

In a case where onboard diagnostics included in a computing device 115 included in a first vehicle 110 determines that sensors 116 are less than 99.9% reliable, and that distance vector $D_1$ is therefore not a reliable measure of distance to traffic object 210, computing device 115 can communicate with a computing device 115 included in second vehicle 110 to receive information including distance vectors $D_2$ and $D_3$. Computing device 115 included in first vehicle can determine a new estimated distance vector D_calc to replace unreliable distance vector $D_1$ based on received distance vectors $D_2$ and $D_3$. Replacing an unreliable distance vector $D_1$ with a new distance vector D_calc can permit computing device 115 to pilot first vehicle 110 safely despite having less than 99.9% reliable sensors 116.

In example traffic scene 200 of FIG. 2, distance from first vehicle 110 and camera 202 from traffic object P 210 can be estimated from information received from second vehicle 110 and second camera 204 including a distance vector $D_3$ and offset $x_1$. Offsets $x_1$ and $x_2$ are projections of a point P on traffic object 210, measured in the focal planes of cameras 202, 204. Computing device 115 can determine a baseline b from distance vector $D_3$, determine a disparity $d=(x_1-x_2)$, and, given the predetermined focal length f of cameras 202, 204, determine a depth z by the equation:

$$\frac{d}{b} = \frac{f}{z} \quad (1)$$

Computing device 115 can use this value of depth z to determine a new estimated distance vector D_calc to replace an unreliable distance vector $D_1$. Determining a new estimated distance vector D_calc to replace an unreliable distance vector $D_1$ based on distance vectors $D_2$ and $D_3$ is discussed in relation to FIG. 5, below.

Figure 3:
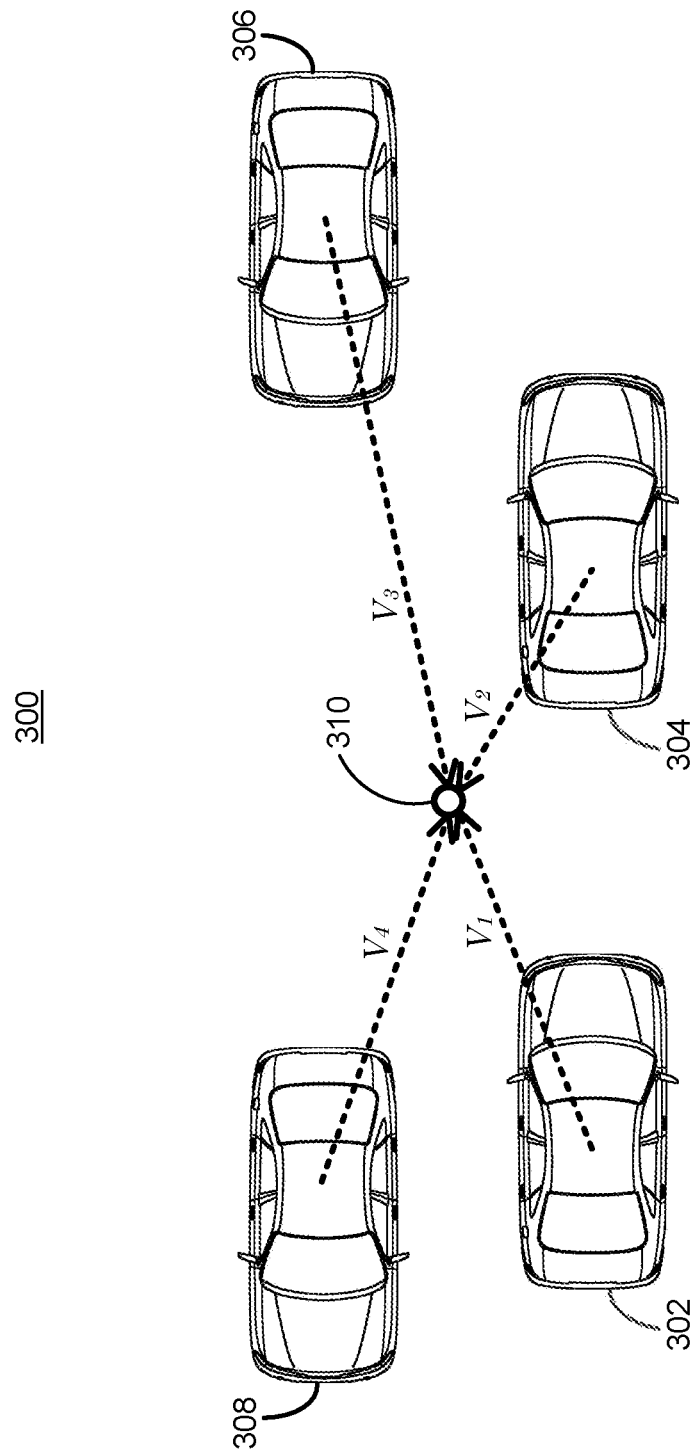
FIG. 3 is a diagram of an example traffic scene including four vehicles.

FIG. 3 is a diagram of an example traffic scene 300 including first, second third and fourth vehicles 302, 304, 306, 308. Each vehicle 302, 304, 306, 308 is equipped to determine a distance vector $V_1$, $V_2$, $V_3$, $V_4$, respectively from vehicle 302, 304, 306, 308 to a traffic object 310. Each vehicle 302, 304, 306, 308 is also equipped with a V-to-I interface 111 to communicate via a local area network. In a case where onboard diagnostics included in computing device 115 included in first vehicle 302 determine that sensors 116 included in first vehicle 302 are operating at less than 99.9% reliability, computing device 115 can communicate with second, third and fourth vehicles 304, 306, 308 to receive information including distance vectors $V_2$, $V_3$, $V_4$ and their locations.

Based on distance vectors $V_2$, $V_3$, $V_4$ and the locations of second, third and fourth vehicles 304, 306, 308, computing device 115 can determine estimated distance vectors V_calc based on each distance vector $V_2$, $V_3$, $V_4$ and each second, third and fourth vehicle 304, 306, 308 location respectively. Computing device 115 can determine an average V_ave and associated standard deviation σ for the estimated distance vectors V_calc to correct distance vector $V_1$.

If computing device 115 determines that an error e exists between the new estimated distance vector V_ave and the original distance vector $V_1$, computing device 115 compares the error e to the standard deviation σ, and if the standard deviation σ is lower than the error e, meaning that good agreement exists regarding the new estimated distance vector V_ave, then computing device 115 can correct the distance vector $V_1$ by a weighted portion of the error e. The weighting factor is a function of the standard deviation σ associated with V_ave, increasing as the standard deviation σ decreases. For example, if computing device 115 determines that $V_1$ is 40 ft. from traffic object 310 and V_ave is equal to 25 ft. with a standard deviation σ equal to one ft., computing device 115 can correct $V_1$ to 29 ft.

If the percent error % e is greater than a predetermined threshold, for example 5%, computing device 115 can slow vehicle 302 down proportionally to the error between the new estimated distance vector V_ave and the original distance vector $V_1$. Percent error % e is can be determined by dividing the error e by the distance vector $V_1$. For example, computing device 115 can direct vehicle 302 to slow down by 1% of an original target speed for each 1% error in the distance vector $V_1$.

In the case where the percent error % e in the distance vector $V_1$ is greater than a predetermined percentage, for example 10%, first vehicle 302 can include this information along with the distance vector $V_1$, thereby flagging the percent error % e when communicating with vehicles 304, 306, 308 to identify that the distance vector $V_1$ is degraded, so that the vehicles 304, 306, 308 will not use the distance vector $V_1$ in similar calculations. Computing device 115 can check received distance vectors $V_2$, $V_3$, $V_4$ to determine if they are flagged as degraded, so as to not use in calculating V_ave and standard deviation σ.

Figure 4:
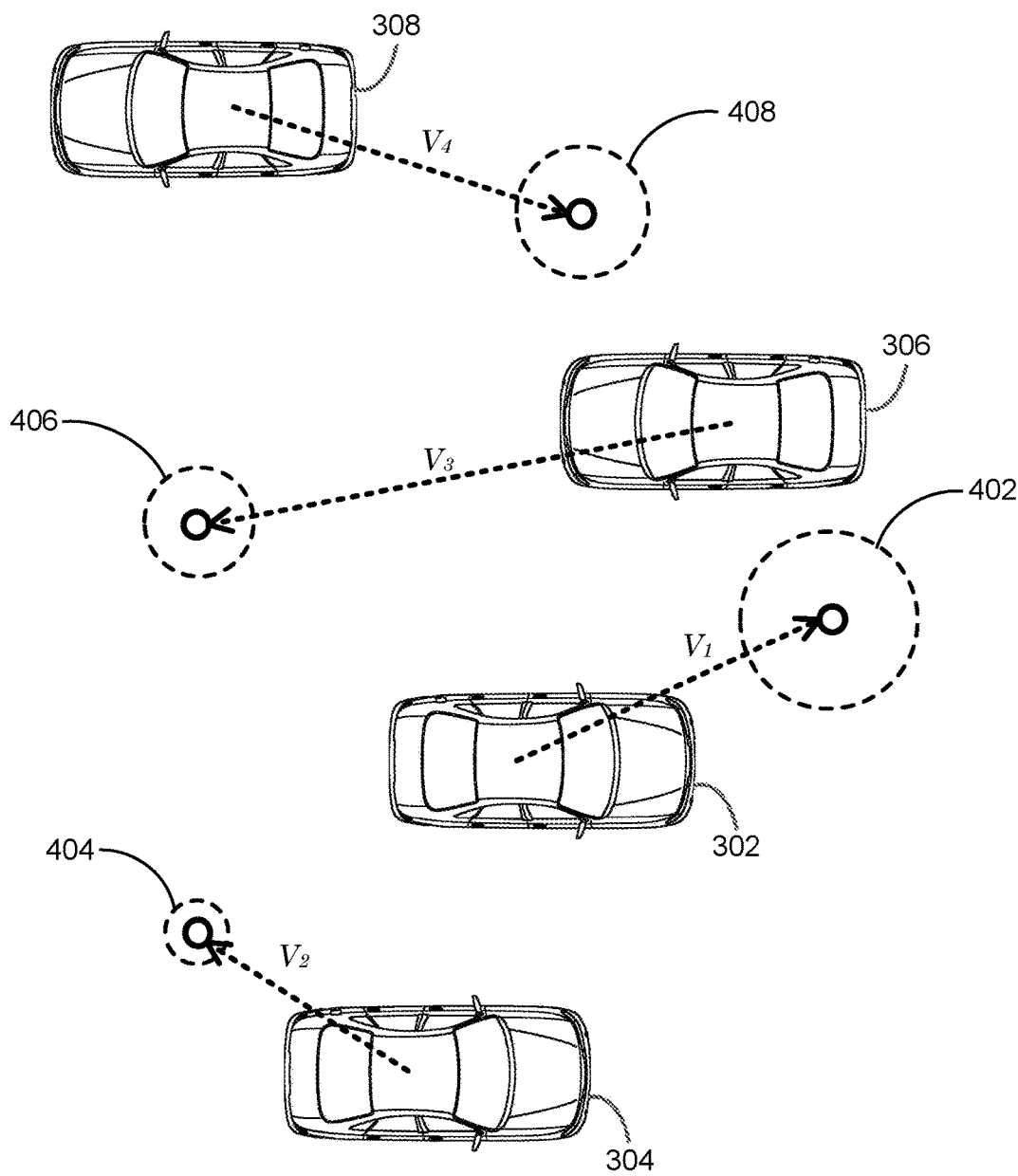
FIG. 4 is a diagram of four example vehicles.

FIG. 4 is a diagram of vehicles 302, 304, 306, 308 from example traffic scene 300, shown individually to increase clarity. Each vehicle 302, 304, 306, 308 is shown with distance vectors $V_1$, $V_2$, $V_3$, $V_4$, respectively, all pointing to traffic object 310. Each distance vector $V_1$, $V_2$, $V_3$, $V_4$ is accompanied by probability distributions 402, 404, 406, 408. A probability distribution 402, 404, 406, 408 is an uncertainty measure that measures the accuracy of the distance vector $V_1$, $V_2$, $V_3$, $V_4$ e.g., the smaller the probability distribution 402, 404, 406, 408, the higher the probability that distance vector $V_1$, $V_2$, $V_3$, $V_4$ is accurate. The dashed circles representing probability distributions 402, 404, 406, 408 can reflect the distribution of a value related to the certainty of object size, angle and distance from vehicle 302, 304, 306, 308 such as the standard deviation σ.

Each probability distribution 402, 404, 406, 408 can be compared to determine a higher accuracy estimate of distance vector $V_1$ than would be achieved by relying on the average and standard deviation σ alone. The new estimated distance vector $V_1$ can be a weighted average, wherein the estimated distance vectors are weighted by the probability distribution function, with estimated distance vectors having smaller probability distributions getting more weight in the average. In this manner, more accurate estimates of distance vectors will have more influence over the final estimated distance vector $V_1$ than less accurate estimates.

Each distance vector $V_1$, $V_2$, $V_3$, $V_4$ can have a different probability distribution 402, 404, 406, 408 since the accuracy of distance vector determination is dependent upon factors such as the distance and the type of sensors 116 used to determine distance. For example, the closer a vehicle 302, 304, 306, 308 is to a traffic object 310, the more accurately the vehicle 302, 304, 306, 308 the more accurately the vehicle can be expected to determine distance. Also, different technologies for determining range or distance in three dimensions differ in accuracy. For example, stereo video cameras can have inherently lower 3D resolution and therefore larger probability distributions than laser-based LIDAR sensors. A combination of probability distributions 402, 404, 406, 408 associated with distance vectors $V_1$, $V_2$, $V_3$, $V_4$ can produce a weighting factor WF that can be used to modify an error e=$V_1$−V_ave used to correct distance vector $V_1$.

In example traffic scene 300, distance component of distance vector $V_1$=60 ft. Distance vector $V_2$ can be used, along with the locations of each vehicle 302, 304 to calculate an estimated distance vector V_calc by triangulation. As shown above in relation to FIG. 2, triangulation is a technique whereby two distance vectors $V_1$, $V_2$ and their locations, which can be used to determine a third distance vectors from the vehicles perpendicular to a line that passes through the point to which each distance vector $V_1$, $V_2$ points to in common. The two distance vectors $V_1$, $V_2$ and the third vector can be arranged to form similar triangles that permit the determination of distance vector $V_1$ from distance vectors $V_2$ and the third vector by trigonometry.

Similarly, distance vectors $V_3$, $V_4$ can be used to calculate additional estimated distance vectors V_calc. The estimated distance vectors V_calc can be summed and averaged to form V_ave, and a standard deviation σ determined for the estimated distance vectors V_calc. In this example, V_ave=50 ft. and σ=2 ft., so the error e=$V_1$−V_ave=10 ft., making % e=10/60 or 16.7%. Since the error e (=10)>σ (=2 ft.), corrected distance vector V_corr=$V_1$−V_ave*WF=55 ft., where weighting factor WF=0.5. The distance vector $V_1$ can be flagged as degraded since the percent error % e of 16.6% is greater than the predetermined threshold of %10.

Figure 5:
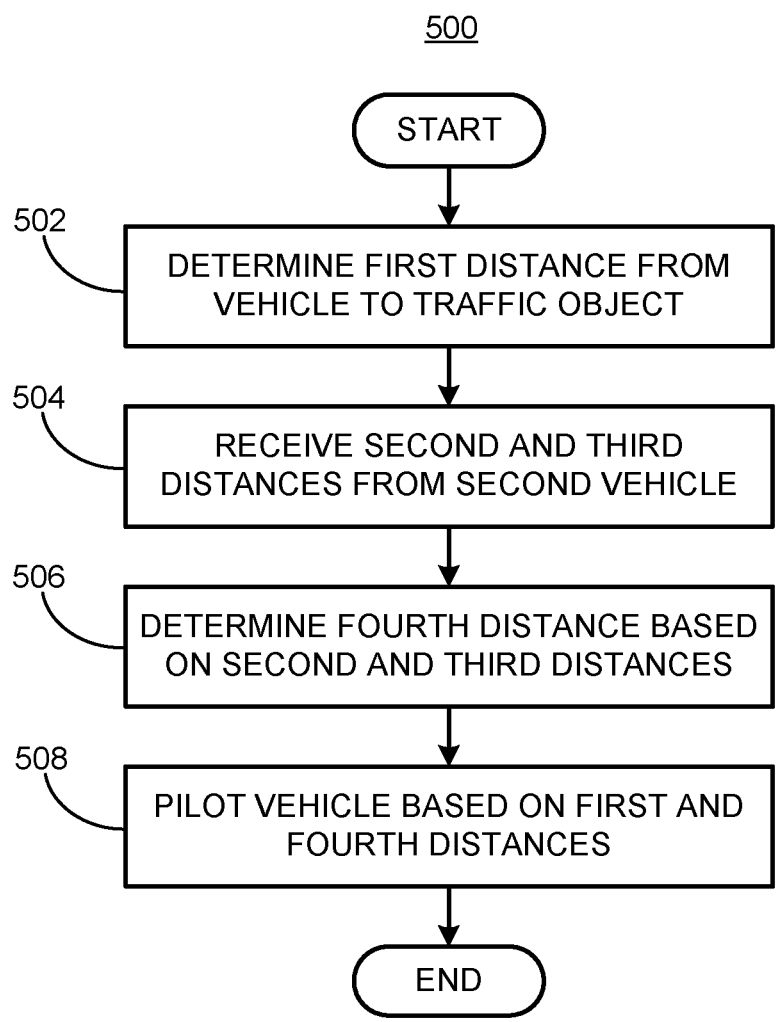
FIG. 5 is a flowchart diagram of an example process to pilot a vehicle.

FIG. 5 is a diagram of a flowchart, described in relation to FIGS. 1-4, of a process 500 for piloting a vehicle 110 based on determined first, second and third distances, e.g., determined as described above. Process 500 can be implemented by a processor of computing device 115, taking as input information from sensors 116, and executing instructions and sending control signals via controllers 112, 113, 114, for example. Process 500 includes multiple steps taken in the disclosed order. Process 500 also includes implementations including fewer steps or can include the steps taken in different orders.

Process 500 can be described with respect to FIG. 2, beginning at step 502, where a computing device 115 included in first vehicle 110 can determine a first distance vector $D_1$ to a point P on traffic object 210. As discussed above in relation to FIG. 2, computing device 115 can determine a first distance vector $D_1$ to a point P on traffic object 210 by inputting data from sensors 116, including video cameras and LIDAR sensors. At step 504 computing device 115 can receive, via V-to-I interface 111, for example, information from a second vehicle 110 including a second distance vector $D_2$ from the second vehicle 110 to the traffic object 210 and a third distance vector $D_3$ from the second vehicle to the first vehicle.

At step 506 computing device 115 can determine a fourth distance vector D_calc by triangulation based on the second distance vector $D_2$ and the third distance vector $D_3$ as discussed above in relation to FIG. 2. The fourth distance vector D_calc is an estimated distance vector from the first vehicle 110 to a point P on traffic object 210. At step 508 computing device 115 pilots the first vehicle 110 by first determining that the distance vector $D_1$ is unreliable, since the probability that sensors 116 are providing accurate and timely data is less than 99.9%. In this case, computing device 115 can use the estimated distance vector D_calc instead of the unreliable distance vector $D_1$ to pilot first vehicle 110.

Figure 6:
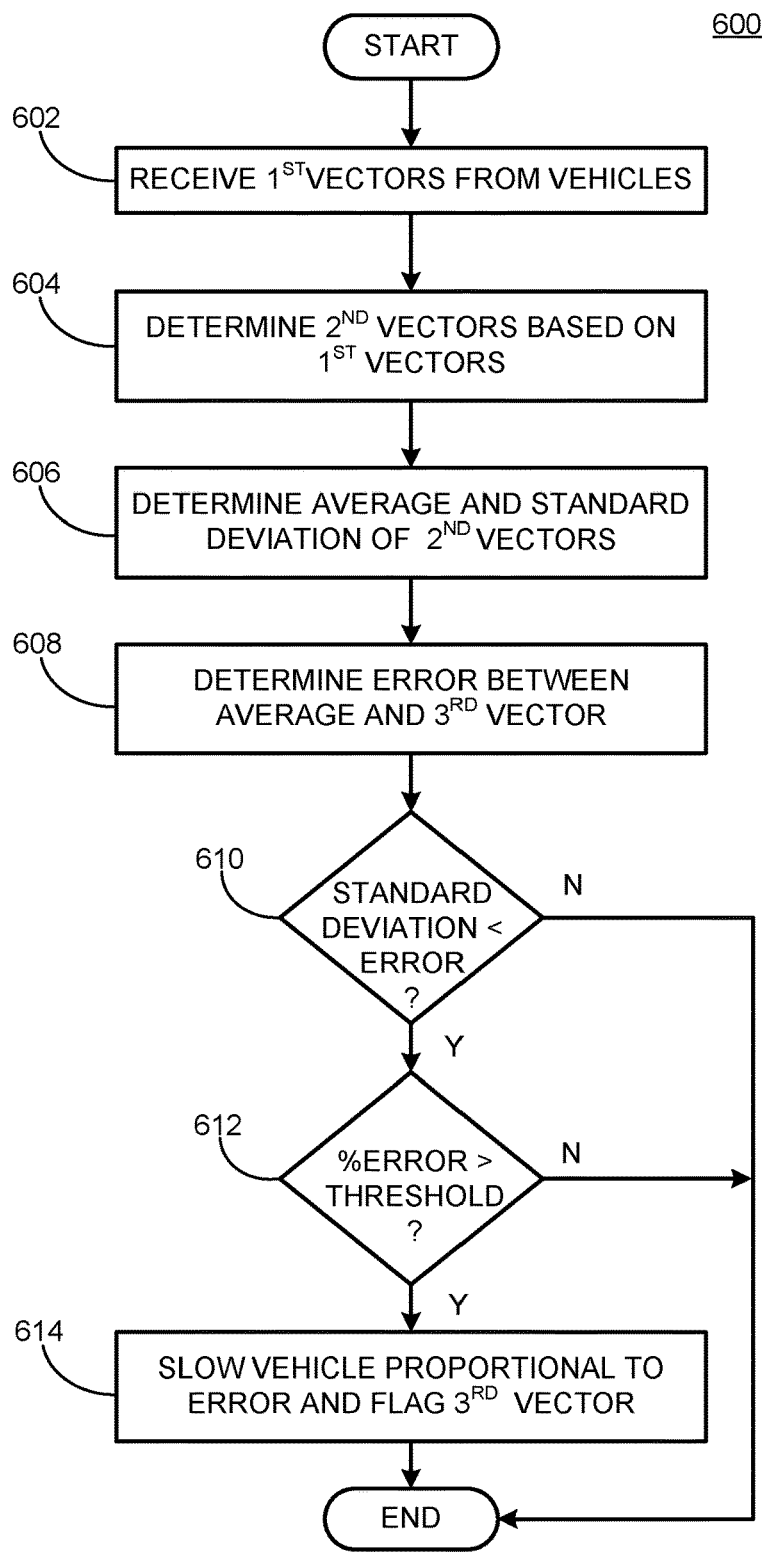
FIG. 6 is a flowchart diagram of an example process to pilot a vehicle.

FIG. 6 is a diagram of a flowchart, described in relation to FIGS. 1-4, of a process 600 for piloting a vehicle 110 based on determined average and standard deviation distances, e.g., as described above. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602 where computing device included in a first vehicle 302 receives, via V-to-I interface 111, for example, first direction vectors $V_2$, $V_3$, $V_4$, from vehicles 304, 306, 308 respectively, to a traffic object 310 as discussed above in relation to FIGS. 3 and 4. At step 604 computing device 115 determines second vectors, where the second vectors are estimated distance vectors V_calc based on first direction vectors $V_2$, $V_3$, $V_4$ by triangulation as discussed in relation to FIGS. 2 and 5.

At step 606 computing device 115 determines an average distance vector V_ave and an associated standard deviation σ based on the estimated distance vectors V_calc. At step 608, computing device 115 determines an error e between a third vector, representing distance vector $V_1$ from vehicle 302 to traffic object 310 and determined by computing device 115 via sensors 116 as discussed above in relation to FIGS. 1, 2, 3 and 4, and the average distance vector V_ave determined at step 606.

At step 610 computing device 115 compares the error e, determined at step 606, with standard deviation σ determined at step 606, and, if the standard deviation σ is greater than or equal to the error e, process 600 ends. If the standard deviation is less than the error e, process 600 proceeds to step 612, where computing device 115 compares the percent error, formed by dividing the error e by the average distance vector V_ave, with a predetermined threshold, for example 5%. If the percent error is less than the predetermined threshold, process 600 ends. If the percent error is greater than a predetermined threshold, process 600 passes to step 614.

At step 614 onboard diagnostics included in computing device 115 can determine the accuracy of sensors 116. Sensor 116 accuracy can be defined as a numeric property that describes the resolution of a sensor 116, in feet, at a given probability of accurate detection, for example 99.9% probability of true detection and 0.1% probability of false negative. In cases where computing device 115 determines that sensors 116 are not 99.9% reliable at a predetermined accuracy and therefore distance vector $V_1$ is unreliable, computing device 115 can correct distance vector $V_1$ based on direction vectors $V_2$, $V_3$, $V_4$, and their respective locations, received from vehicles 304, 306, 308 as discussed above in relation to FIGS. 3 and 4. Computing device 115 can weight the contribution each direction vector $V_2$, $V_3$, $V_4$ makes to the estimated direction vector V_ave based on information received from vehicles 304, 306, 308 regarding the accuracy of their respective sensors 116.

Several explanations exist to explain differences in sensor 116 accuracy among vehicles 302, 304, 306, 308, for example. One or more vehicles 302, 304, 306, 308 can be equipped with more accurate or a higher number of sensor 116 arrays to detect traffic objects 310 and other vehicles 302, 304, 306, 308. Each vehicle 302, 304, 306, 308 can connect via a V-to-I interface 111 to a network with a higher or lower accuracy estimate of the vehicle's 302, 304, 306, 308 locations, for example, since different vehicles 302, 304, 306, 308 can have a different network, similar to different mobile phones having different mobile phone carriers. Each network can have an estimate of the vehicle's 302, 304, 306, 308 locations that has a different accuracy than other networks, for example.

In other cases, sensor 116 accuracy can differ because one or more vehicles 302, 304, 306, 308 can be experiencing more or less interference in detecting surrounding objects than other of the vehicles 302, 304, 306, 308, e.g., due to environmental interference (snow, ice covering sensors, etc.), visible light interference on camera systems (headlights, solar reflections, etc.), IR interference (thermal hotspots like steam propagating out of a manhole cover), electromagnetic interference (high density local radio traffic), etc. In yet other cases, sensor 116 accuracy can differ because one or more vehicles 302, 304, 306, 308 is a newer model-year vintage with newer, more accurate sensing/ locating technology than other of vehicles 302, 304, 306, 308.

Each vehicle 304, 306, 308 can include accuracy information regarding distance vectors $V_2$, $V_3$, $V_4$ and their locations along with the distance vectors $V_2$, $V_3$, $V_4$ and locations when communicating with first vehicle 302 via V-to-I interface 111 thereby permitting first vehicle 302 to determine a weighting factor WF as discussed above in relation to FIGS. 3 and 4 based on the received accuracy information.

In summary, process 600 describes a process by which a vehicle 110 can improve the accuracy and reliability of sensors 116 and thereby increase the ability of computing device 115 to pilot vehicle 110 by using vehicle-to-vehicle and vehicle-to-infrastructure wireless communications. Vehicle-to-vehicle and vehicle-to-infrastructure communications can be used to independently verify sensor 116 accuracy and reliability, thereby providing redundancy for a safety-critical function without requiring additional hardware.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
    determining a first distance from a first vehicle to a traffic object;
    receiving, via a network interface, a second distance from a second vehicle to the traffic object and a third distance from the second vehicle to the first vehicle;
    determining a fourth distance by triangulation based on the second distance and the third distance;
    piloting the first vehicle based on combining the first and fourth distances;
    receiving, via the network interface, one or more additional second distances from one or more additional second vehicles to the traffic object, and one or more additional third distances from one or more additional second vehicles to the first vehicle;
    determining an average fourth distance and a standard deviation based on the second distance, the additional second distances, the third distance, and the additional third distances; and
    piloting the first vehicle based on combining the first distance, the average fourth distance and the standard deviation.

2. The method of claim 1, wherein the traffic object is one or more of a roadway, a barrier, an abutment, a pillar, a sign, a post, a railing, a signal, a marking, a parked vehicle and a moving vehicle.

3. The method of claim 1 wherein the network interface includes a local area network and the Internet.

4. The method of claim 1 wherein the first distance, second distances, third distances and fourth distances are determined as vector distances.

5. The method of claim 1 wherein combining the first distance with the fourth distance includes comparing the first distance with the fourth distance and, if the first and fourth distances differ, selecting the distance associated with a higher accuracy value.

6. The method of claim 1, further comprising:
    determining probability functions based on the second distances and determined sizes and angles of the traffic object relative to the second vehicles; and
    combining the probability functions and the third distances to determine the average fourth distance and the standard deviation.

7. The method of claim 6, wherein the probability functions are adapted based on accuracy values.

8. The method of claim 1, wherein piloting the vehicle includes slowing down proportionally to output of an error function based on combining the first distance with the average fourth distance and the standard deviation.

9. The method of claim 8, wherein slowing down proportionally to the error function includes comparing the error function to a predetermined threshold, and, if the error function exceeds the predetermined threshold, reducing speed proportional to the error function.

10. An apparatus, comprising:
a processor; and
a memory, the memory storing instructions executable by the processor to:
determine a first distance from a vehicle to a traffic object;
receive, via a network interface, a second distance from a second vehicle to the traffic object and a third distance from the second vehicle to the vehicle;
determine a fourth distance by triangulation based on the second distance and the third distance;
pilot the vehicle based on combining the first distance and the fourth distance;
receive, via the network interface, one or more additional second distances from one or more additional second vehicles to the traffic object, and one or more additional third distances from one or more additional second vehicles to the vehicle;
determine an average fourth distance and a standard deviation based on the second distance, the additional second distances, the third distance, and the additional third distances; and
pilot the vehicle based on combining the first distance, the average fourth distance and the standard deviation.

11. The apparatus of claim 10, wherein the traffic object is one or more of a roadway, a barrier, an abutment, a pillar, a sign, a post, a railing, a signal, a marking, a parked vehicle and a moving vehicle.

12. The apparatus of claim 10 wherein the network interface includes a local area network and the Internet.

13. The apparatus of claim 10 wherein the first distance, second distances, third distances and fourth distances are determined as vector distances.

14. The apparatus of claim 10 wherein combining the first distance with the fourth distance includes comparing the first distance with the fourth distance and, if the first and fourth distances differ, selecting the distance associated with a higher accuracy value.

15. The apparatus of claim 10, further comprising:
determine probability functions based on the second distances and determined sizes and angles of the traffic object relative to the second vehicles; and
combine the probability functions and the third distances to determine the average fourth distance and the standard deviation.

16. The apparatus of claim 15, wherein the probability functions are adapted based on accuracy values.

17. The apparatus of claim 1, wherein pilot the vehicle includes slowing down proportionally to output of an error function based on combining the first distance with the average fourth distance and the standard deviation.

18. The apparatus of claim 17, wherein slowing down proportionally to the error function includes comparing the error function to a predetermined threshold, and, if the error function exceeds the predetermined threshold, reducing speed proportional to the error function.

* * * * *